United States Patent
Yan et al.

(10) Patent No.: US 12,477,585 B2
(45) Date of Patent: Nov. 18, 2025

(54) INFORMATION PROCESSING METHOD AND APPARATUS, DEVICE AND STORAGE MEDIUM

(71) Applicant: DATANG MOBILE COMMUNICATIONS EQUIPMENT CO., LTD., Beijing (CN)

(72) Inventors: Xue Yan, Beijing (CN); Nan Yan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/833,355

(22) PCT Filed: Jan. 18, 2023

(86) PCT No.: PCT/CN2023/072967
§ 371 (c)(1),
(2) Date: Jul. 25, 2024

(87) PCT Pub. No.: WO2023/143323
PCT Pub. Date: Aug. 3, 2023

(65) Prior Publication Data
US 2025/0142626 A1 May 1, 2025

(30) Foreign Application Priority Data

Jan. 28, 2022 (CN) .......................... 202210106306.X (51) Int. Cl.
*H04W 74/0833* (2024.01)
(52) U.S. Cl.
CPC ............................... *H04W 74/0833* (2013.01)
(58) Field of Classification Search
CPC ................. H04W 74/0833; H04W 74/00
See application file for complete search history.

(56) References Cited

U.S. PATENT DOCUMENTS

2022/0095125 A1    3/2022  Xiao et al.
2022/0217781 A1*   7/2022  Decarreau ............. H04W 24/10
(Continued)

FOREIGN PATENT DOCUMENTS

CN    110913496 A    3/2020
CN    112055374 A   12/2020
(Continued)

OTHER PUBLICATIONS

International Search Report in International Application No. PCT/CN2023/072967, mailed Apr. 28, 2023.
Written Opinion of the International Searching Authority in International Application No. PCT/CN2023/072967, mailed Apr. 28, 2023 with English translation provided by WIPO.
3GPP TSG-RAN WG2 #110e R2-2004733, "Clarification to RA-report purposes", May 21, 2020.
3GPP TSG-RAN WG2 #111e R2-2007657, "On the need of SCell indication in the RA-report", Aug. 7, 2020.
(Continued)

*Primary Examiner* — Siren Wei
(74) *Attorney, Agent, or Firm* — Ladas & Parry, LLP (57) ABSTRACT

This application provides an information processing method, an information processing apparatus, a device and a computer readable storage medium, which relates to the technical field of communications. The information processing method includes: receiving an SCG activation command from a network side; and activating an SCG according to the SCG activation command, and recording information related to the SCG activation procedure. In this application, when activation of the SCG is performed according to the SCG activation command from the network side, a UE records the information related to the SCG activation procedure, and reports it to the network side, which assists optimization of SCG activation procedure for the network side, reduces SCG activation latency, and reduces probability of SCG activation failure.

7 Claims, 3 Drawing Sheets

(56) References Cited

U.S. PATENT DOCUMENTS

| | | | |
|---|---|---|---|
| 2023/0026279 A1* | 1/2023 | Kumar | H04W 76/19 |
| 2023/0156806 A1* | 5/2023 | Pantelidou | H04W 74/002 |
| | | | 370/329 |
| 2023/0337286 A1 | 10/2023 | Zhang et al. | |

FOREIGN PATENT DOCUMENTS

| | | | |
|---|---|---|---|
| CN | 113395789 A | 9/2021 | |
| CN | 113692070 A | 11/2021 | |
| CN | 115087129 A | 9/2022 | |
| WO | 2021067236 A1 | 4/2021 | |

OTHER PUBLICATIONS

3GPP TSG-RAN WG2 Meeting #114 R2-2106312, "Discussion on SCG activation", May 11, 2021.

Extended European search report from corresponding European Patent Application No. 23746204.9 dated Mar. 24, 2025.

Huawei et al.: "UE behaviour in deactivated SCG", 3GPP Draft; R2-2103978, 3GPP TSG-RAN WG2 meeting #113bis-e, online, Apr. 12-Apr. 20, 2021 (retrieved Apr. 2, 2021).

ZTE Corporation et al.: "Discussion on UE behaviour when SCG is deactivated", 3GPP Draft; R2-2107746, 3GPP TSG-RAN WG2 meeting #115e, Apr. 16-27, 2021 (retrieved Aug. 6, 2021).

* cited by examiner

INFORMATION PROCESSING METHOD AND APPARATUS, DEVICE AND STORAGE MEDIUM

CROSS-REFERENCE TO RELATED APPLICATIONS

This application is the U.S. national phase of PCT Application No. PCT/CN2023/072967 filed on Jan. 18, 2023, which claims a priority to Chinese patent application No. 202210106306.X filed on Jan. 28, 2022, the disclosures of which are incorporated in their entirety by reference herein.

TECHNICAL FIELD

This application relates to the technical field of communications, in particular to an information processing method, an information processing apparatus, a device, and a computer readable storage medium.

BACKGROUND

In a multi-connectivity scenario, for the sake of power-saving and rapid activation of a Secondary Cell Group (Secondary Cell Group, SCG) for data transmission, a User Equipment (User Equipment, UE) may set the SCG to be in a deactivated state in the case of a small data transmission volume. However, in a case of activating the SCG in the deactivated state, statistical recording of Random Access (Random Access, RA) related information by the UE may be adversely affected by an SCG activation procedure.

When a conventional method for statistical recording of the RA related information is adopted, the RA related information and other auxiliary information in the SCG activation procedure can not be recorded or can not be accurately recorded, so assisting a network side in performing optimization processing on the SCG activation procedure can not be achieved.

SUMMARY

This application provides an information processing method, an information processing apparatus, a device and a computer readable storage medium, which can solve at least one technical problem in the related technologies.

In a first aspect, this application provides in some embodiments an information processing method, including: receiving a Secondary Cell Group (SCG) activation command from a network side; and activating an SCG according to the SCG activation command, and recording information related to the SCG activation procedure, so as to report it to the network side.

In a possible embodiment of this application, the activating the SCG according to the SCG activation command and recording the information related to the SCG activation procedure includes: activating the SCG according to the SCG activation command; and if the SCG is activated successfully, recording information related to the SCG activation success procedure in a Random Access (RA) report.

In a possible embodiment of this application, the information related to the SCG activation success procedure includes: information indicating that an access purpose of a current random access procedure is to activate an SCG.

In a possible embodiment of this application, the information processing method further includes: reporting the RA report to the network side in response to a request from the network side, where the RA report is used by the network side to perform SCG activation configuration optimization and/or Random Access Channel (RACH) resource optimization.

In a possible embodiment of this application, the activating the SCG according to the SCG activation command and recording the information related to the SCG activation procedure includes: activating the SCG according to the SCG activation command; and if the SCG fails to be activated, recording information related to the SCG activation failure procedure in a Radio Link Failure (RLF) report or an SCG failure message.

In a possible embodiment of this application, the information related to the SCG activation failure procedure includes: information indicating that a failure type is SCG activation failure.

In a possible embodiment of this application, the information processing method further includes: sending the SCG failure message to the network side; or reporting the RLF report to the network side in response to a request from the network side; where the RLF report or the SCG failure message is used by the network side to analyze a cause for a current SCG activation failure and perform SCG activation configuration optimization and/or RACH resource optimization.

In a possible embodiment of this application, the information related to the SCG activation success/failure procedure further includes at least one of: information about a RACH resource used in a current random access procedure; information indicating whether RACH-less SCG activation is performed in a current procedure for activating the SCG; a cause why RACH-less SCG activation is not performed; information indicating a result of RACH-less SCG activation; Timing Advance (TA) related information; Radio Resource Management (RRM) measurement related information; beam related information; Transmission Configuration Indicator (TCI) state information configured by the network side in the SCG activation command; information indicating whether the network side indicates to activate the SCG through an RACH procedure in the SCG activation command; information indicating whether a dedicated RACH resource configured by the network side for activating the SCG is carried in the SCG activation command; information about a position and information about a mobility speed of the UE at a time when the SCG activation command is received; a time interval between a time point when the SCG activation command is received and a time point when the SCG is activated successfully; a time interval between a time point when it is detected that a Timing Advance Timer (TAT) has expired or stopped and a time point when the SCG activation command is received by the UE; or a time interval between a time point when Beam Failure (BF) or Radio Link Failure (RLF) is detected and a time point when the SCG activation command is received by the UE.

In a possible embodiment of this application, the TA related information includes at least one of: a configured value of the TAT; a runtime value of the TAT at a time when the SCG activation command is received; or indication information indicating whether the TAT is running when the SCG activation command is received.

In a second aspect, this application provides in some embodiments an information processing method, including: transmitting a Secondary Cell Group (SCG) activation command to a User Equipment (UE), where the SCG activation command is used by the UE to activate an SCG; and receiving information related to the SCG activation procedure reported by the UE, where the information related to the SCG activation procedure is information involved in the SCG activation procedure that is recorded by the UE.

In a possible embodiment of this application, the network side includes a Master Node (MN) side and a Secondary Node (SN) side, where in a case that the information related to the SCG activation procedure is received by the MN side from the UE, the information processing method further includes: performing, by the MN, optimization processing according to the information related to the SCG activation procedure; and transmitting, by the MN, all of or a part of information in the information related to the SCG activation procedure to the SN, in order for the SN to perform optimization processing or the SN and the MN together to perform optimization processing;

where in a case that the information related to the SCG activation procedure is received by the SN side from the UE, the information processing method further includes: performing, by the SN, optimization processing according to the information related to the SCG activation procedure.

In a possible embodiment of this application, the performing the optimization processing includes:

performing SCG activation configuration optimization and/or Random Access Channel (RACH) resource optimization according to information related to an SCG activation success procedure recorded in a Random Access (RA) report;

analyzing a cause for a current SCG activation failure according to information related to an SCG activation failure procedure recorded in a Radio Link Failure (RLF) report or an SCG failure message, and performing SCG activation configuration optimization and/or RACH resource optimization.

In a third aspect, this application provides in some embodiments an information processing apparatus for a UE, including: a reception module, configured to receive a Secondary Cell Group (SCG) activation command from a network side; and an execution module, configured to activate an SCG according to the SCG activation command, and record information related to the SCG activation procedure, so as to report it to the network side.

In a fourth aspect, this application provides in some embodiments an information processing apparatus for a network side, including: a transmission module, configured to transmit a Secondary Cell Group (SCG) activation command to a User Equipment (UE), where the SCG activation command is used by the UE to activate an SCG; and a reception module, configured to receive information related to the SCG activation procedure reported by the UE, where the information related to the SCG activation procedure is information involved in the SCG activation procedure that is recorded by the UE.

In a fifth aspect, this application provides in some embodiments a UE, including a memory, a transceiver and a processor. The memory is configured to store therein a computer program, the transceiver is configured to transmit and receive data under the control of the processor, and the processor is configured to read the computer program in the memory so as to implement the above-mentioned information processing method in the first aspect.

In a sixth aspect, this application provides in some embodiments a network side device, including a memory, a transceiver and a processor. The memory is configured to store therein a computer program, the transceiver is configured to transmit and receive data under the control of the processor, and the processor is configured to read the computer program in the memory so as to implement the above-mentioned information processing method in the second aspect.

In a seventh aspect, this application provides in some embodiments a computer readable storage medium storing therein a computer program. The computer program is executed by a processor so as to implement the above-mentioned information processing method in the first aspect.

In an eighth aspect, this application provides in some embodiments a computer readable storage medium storing therein a computer program. The computer program is executed by a processor so as to implement the above-mentioned information processing method in the second aspect.

Solutions of this application have the following beneficial effects.

When the UE activates the SCG according to the SCG activation command from the network side, the UE records the information related to the SCG activation procedure, and reports it to the network side, so as to assist the network side in optimizing SCG activation procedure, which can reduce SCG activation latency, and reduce probability of SCG activation failure.

BRIEF DESCRIPTION OF THE DRAWINGS

In order to illustrate the technical solutions in the embodiments of this application in a clearer manner, the drawings required for description of the embodiments of this application will be described hereinafter briefly.

DETAILED DESCRIPTION

This application will be described hereinafter in conjunction with the embodiments and the drawings. Identical or similar reference numbers represent an identical or similar element or elements having an identical or similar function. The following embodiments described in conjunction with the drawings are for illustrative purposes only and are only used to explain the present application, but shall not be used to limit the scope of this application.

It should be appreciated by those skilled in the art that, unless otherwise defined, such words as "a", "an", "the" or "said" used herein with a singular form may also include the plural form. It should be also appreciated that such words as "include" in the specification of this application intend to indicate that there exist the features, integers, steps, operations, elements and/or assemblies, without excluding the existence or addition of one or more other features, integers, steps, operations, elements, assemblies and/or combinations thereof. It should be also appreciated that, in the case that an element is referred to as being "connected" or "coupled" to another element, it may be directly connected or coupled to the another element, or an intermediate element may be arranged therebetween. In addition, "connection" or "coupling" used herein may include wireless connection or wireless coupling. The expression "and/or" is used to indicate the existence of all or any one of one or more associated items that are listed, or all combinations thereof.

In order to make the objects, the technical solutions and the advantages of this application more apparent, embodiments of this application will be described in detail hereinafter in conjunction with the drawings.

The technical solutions in the embodiments of this application may be applied to various systems, especially $5^{th}$ Generation (5G) systems. For example, the applicable system may be a global system of mobile communication (Global System of Mobile Communication, GSM) system, a code division multiple access (Code Division Multiple Access, CDMA) system, a wideband code division multiple access (Wideband Code Division Multiple Access, WCDMA) system, a general packet radio service (general packet radio service, GPRS) system, a long term evolution (Long Term Evolution, LTE) system, an LTE frequency division duplex (frequency division duplex, FDD) system, an LTE time division duplex (time division duplex, TDD) system, a long term evolution advanced (long term evolution advanced, LTE-A) system, a universal mobile telecommunication system (universal mobile telecommunication system, UMTS), a worldwide interoperability for microwave access (worldwide interoperability for microwave access, WiMAX) system, a 5G new radio (New Radio, NR) system, etc. These systems each include a terminal and a network device. The system may also include a core network part, such as an evolved packet system (Evolved Packet System, EPS), a 5G system (5GS), etc.

First, some terms involved in the embodiments of this application will be explained as follows.

The terminal involved in the embodiments of this application may refers to a device that provides voice and/or data connectivity to a user, a handheld device with a wireless connection function, or other processing devices connected to a wireless modem. In different systems, the name of the terminal device may be different. For example, in 5G systems, the terminal device may be referred to as a user equipment (User Equipment, UE). A wireless terminal device may communicate with one or more core networks (Core Network, CN) through a radio access network (Radio Access Network, RAN). The wireless terminal device may be a mobile terminal device, such as a mobile phone (or referred to as a "cellular" phone) or a computer with a mobile terminal device, for example, it may be a portable, pocket type, handheld, computer built-in, or vehicle mounted mobile device, which exchanges languages and/or data with a radio access network. For example, it may be a personal communication service (Personal Communication Service, PCS) phone, a cordless phone, a session initiated protocol (Session Initiated Protocol, SIP) phone, a wireless local loop (Wireless Local Loop, WLL) station, a personal digital assistant (Personal Digital Assistant, PDA), or other devices. Or the wireless terminal device may be referred to as a system, a subscriber unit (subscriber unit), a subscriber station (subscriber station), a mobile station (mobile station), a mobile (mobile), a remote station (remote station), an access point (access point), a remote terminal (remote terminal), an access terminal (access terminal), a user terminal (user terminal), a user agent (user agent), or a user device (user device), which is not limited in the embodiments of this application.

The network side device involved in the embodiments of this application may be a base station, and the base station may have multiple cells providing services for terminals. According to different application scenarios, the base station may also be referred to as an access point, or may be a device in an access network that communicates with wireless terminal devices through one or more sectors on air interfaces, or may have other names. The network side device may be configured to exchange received air frames and Internet protocol (Internet Protocol, IP) packets, serving as a router between the wireless terminal devices and rest of the access network, where the rest of the access network may include an Internet Protocol (IP) communication network. The network side device may also coordinate attribute management of air interfaces.

For example, the network side device involved in the embodiments of this application may be a network device (Base Transceiver Station, BTS) in a global system for mobile communications (Global System for Mobile Communications, GSM) or a code division multiple access (Code Division Multiple Access, CDMA), or may be a network device (NodeB) in wide-band code division multiple access (Wide-band Code Division Multiple Access, WCDMA), or may be an evolutional network device (evolutional Node B, eNB or e-NodeB) in a long term evolution (Long Term Evolution, LTE) system or a 5G base station (gNB) in a 5G network architecture (next generation system), or may be a home evolved node B (Home evolved Node B, HeNB), a relay node (relay node), a femto (femto), a pico (pico), etc., which is not limited in the embodiments of this application. In some network structures, the network side device may include a centralized unit (centralized unit, CU) node and a distributed unit (distributed unit, DU) node, and the centralized unit and the distributed unit may be geographically separated.

The network side device and the terminal may each use one or more antennas to perform multi input multi output (Multi Input Multi Output, MIMO) transmission, where the MIMO transmission may be single user MIMO (Single User MIMO, SU-MIMO) or multiple user MIMO (Multiple User MIMO, MU-MIMO). According to the form and the quantity of the antenna combination, the MIMO transmission may be 2D-MIMO, 3D-MIMO, FD-MIMO, or Massive MIMO, or may be diversity transmission, or precoding transmission, or beamforming transmission, etc.

Next, the related technologies will be described and explained hereinafter.

(1) Deactivation of Secondary Cell Group (Secondary Cell Group, SCG)

In a multi-connectivity scenario, there are one Master Cell Group (Master Cell Group, MCG) and one or more Secondary Cell Groups (SCG). A cell group on a Master Node (MN) side is called as a Master Cell Group, and it includes one Primary Cell (Primary Cell, PCell) and zero or more Secondary Cells (Secondary Cell, SCell). A cell group on a Secondary Node (Secondary Node, SN) side is called as a Secondary Cell Group, and similarly it includes one Primary Secondary Cell (Primary Secondary Cell, PSCell) and zero or more Secondary Cells. Currently, only the dual-connectivity scenario is supported in the related technologies. In a case that dual-connectivity is configured for a UE in a connected state, the MN and the SN may exchange date with the UE simultaneously.

For the sake of power-saving and rapid activation of an SCG for data transmission, the UE may set the SCG side to be in a deactivated SCG state in the case of a small data transmission volume. In the deactivated SCG state, the UE does not monitor a Physical Downlink Control Channel (Physical Downlink Control Channel, PDCCH) on the SCG side, and does not transmit a Physical Uplink Shared Channel (Physical Uplink Shared Channel, PUSCH).

(2) Activation/Deactivation of SCG

The MN/SN/UE may request to activate an SCG, and an SCG activation command triggered by a network is transmitted by the MN to the UE. The MN/SN may request to deactivate the SCG, and an SCG deactivation command triggered by the network is transmitted by the MN to the UE. In an SCG activation/deactivation procedure, interaction between UE/MN and MN/SN is performed through Radio Resource Control (Radio Resource Control, RRC) signaling.

Upon the reception of the SCG activation command, the UE executes an RACH procedure to activate the SCG when the SCG activation command indicates that the UE needs to complete the SCG activation through the Random Access Channel (Random Access Channel, RACH) procedure. In a case that the SCG activation command does not indicate the UE to activate the SCG through the RACH procedure, the UE may perform RACH-less SCG activation (i.e., there is no RACH procedure during activation of the SCG, and activation of the SCG is performed directly) when a certain condition is met, e.g., when a TAT is running and no BF/RLF has been detected; in other words, the UE may directly monitor the PDCCH or directly transmits Uplink (Uplink, UL) data (if there is a UL resource); when the condition is not met, the UE still needs to activate the SCG through the RACH procedure using a common RACH resource. When the UE needs to activate the SCG through the RACH procedure, the UE activates the SCG using a dedicated RACH resource in a case that the received activation command carries the dedicated RACH resource, and the UE activates the SCG using a common RACH resource in a case that the SCG activation command includes no dedicated RACH resource.

(3) Statistical Recording of Random Access (Random Access, RA) Related Information In a current mechanism, when the UE performs an RA procedure successfully, the UE records information related to the successful RA in an RA report, which includes random access purpose, random access resource information, etc. When the RA procedure performed by the UE is failed, the UE records information related to the failed RA in a Connection Establishment Failure (Connection Establishment Failure, CEF) report or a Radio Link Failure (Radio Link Failure, RLF) report, which mainly includes information related to the RA resource. When the network requests the UE to report the recorded RA report or CEF/RLF report, the UE reports the recorded RA report or CEF/RLF report to the network side, so that the network side performs relevant RACH analysis and optimization.

An SCG activation procedure introduced in the Multi-Radio Dual Connectivity (Multi-Radio Dual Connectivity, MDRC) technology may adversely affect the statistical recording of the RA related information by the UE.

For example, in a case that the UE performs the SCG activation through the RACH procedure, when the RA is performed successfully and the SCG is activated successfully, the UE needs to record information related to the successful RA in the RA report. However, in the RA purpose in the RA report, there is no selection corresponding to the SCG activation.

In addition, in a case that the activation command from the network side includes no RACH indicator (i.e., the network side may consider that the UE may perform RACH-less SCG activation), and when a certain condition is met, the UE performs the RACH-less SCG activation and the activation is not successful, then the UE activates the SCG successfully through triggering a contention-based RA procedure. In this case, the UE merely records the last successful RA procedure rather than intermediate procedure such as the RACH-less SCG activation. In this way, upon the reception of the RA report, the network side merely knows that the current RA is used to activate the SCG and the SCG has been activated successfully through the RACH procedure, but does not know that the UE ever failed to activate the SCG through the RACH-less procedure. As a result, the network side can not optimize the SCG activation procedure.

In addition, when the UE fails to activate the SCG, in the current mechanism, the UE does not report information about the complete SCG activation procedure. As a result, insufficient auxiliary information is provided to the network side to perform failure optimization, an optimizing effect is not obvious, and the probability of SCG activation failure can not be effetely reduced.

In view of the above, this application provides in some embodiments a method for recording information related to the SCG activation procedure, which can completely and accurately records the RA related information as well as other auxiliary information that are involved in the SCG activation procedure, so as to assist the network side in optimizing RACH resource configuration and determining an SCG activation mode, thereby reducing SCG activation latency and reducing the probability of SCG activation failure.

The technical solutions in the embodiments of this application and how to solve the above-mentioned problems through the technical solutions will be described hereinafter in conjunction with the specific embodiments. The specific embodiments may be combined together, and some identical or similar concepts or processes will not be repeated in some embodiments of this application. Embodiments of this application will be described hereinafter in conjunction with the drawings.

Figure 1:
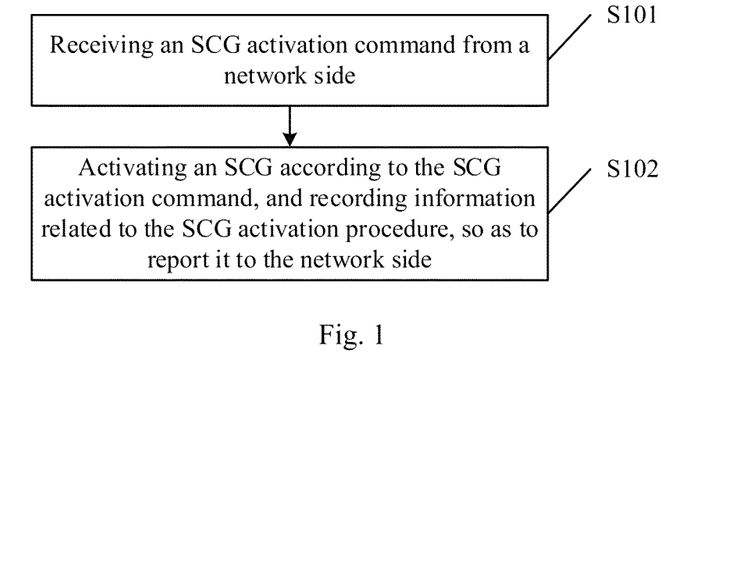
FIG. 1 is a flow chart of an information processing method according to embodiments of this application.

As shown in FIG. 1, this application provides in some embodiments an information processing method, which includes following steps.

S101 includes: receiving an SCG activation command from a network side; and

S102 includes: activating an SCG according to the SCG activation command, and recording information related to the SCG activation procedure, so as to report it to the network side.

In the embodiments of this application, when the UE activates the SCG according to the SCG activation command from the network side, the UE records the information related to the SCG activation procedure, and reports it to the network side, so as to assist the network side in optimizing SCG activation procedure, which can reduce SCG activation latency, and reduce probability of SCG activation failure.

In a possible embodiment of this application, in S102, the activating the SCG according to the SCG activation command may include: determining a mode for activating the SCG according to information indicating whether the network side indicates to activate the SCG through an RACH procedure in the SCG activation command, and activating the SCG according to the determined mode.

To be specific, there exist the following two circumstances for determining the mode for activating the SCG.

In a first circumstance, in a case that the network side indicates not to use an RACH procedure to activate the SCG, the UE determines the mode for activating the SCG according to status information about its Timing Advance Timer (TAT), and a result of Radio Link Monitoring (RLM) and/or Beam Failure Detection (BFD).

1. In a case that it is detected that the TAT is running, and Beam Failure (BF) and Radio Link Failure (RLF) are not detected, the mode for activating the SCG is determined to be the UE performing RACH-less SCG activation, i.e., directly performing an SCG activation procedure without performing an RACH procedure.

2. In a case that any of the following preset conditions is met, the mode for activating the SCG is determined to be the UE using a common RACH resource to perform an RACH procedure to activate the SCG; where the present conditions include:
  a result of RACH-less SCG activation performed by the UE is that activation is failed;
  it is detected that the TAT has expired or stopped;
  BF has been detected;
  RLF has been detected.

In a second circumstance, in a case that the network side indicates to use an RACH procedure to activate the SCG, the mode for activating the SCG is determined according to whether the SCG activation command carries a dedicated RACH resource configured by the network side.

1. In a case that a dedicated RACH resource configured by the network side is carried, the mode for activating the SCG is determined to be using the dedicated RACH resource to perform an RACH procedure to activate the SCG.

2. In a case that a dedicated RACH resource configured by the network side is not carried, or using the dedicated RACH resource to perform an RACH procedure to activate the SCG by the UE is failed, the mode for activating the SCG is determined to be the UE using a common RACH resource to perform an RACH procedure to activate the SCG.

It should be noted that, in the above embodiments of this application, there exist the following two modes for indicating by the network side.

In a first mode, indication information is carried in the SCG activation command, and the indication information indicates the UE to activate the SCG through an RACH procedure, or indicates the UE not to activate the SCG through an RACH procedure.

In a second mode, in a case that the network side indicates to activate the SCG through an RACH procedure, indication information indicating the UE to activate the SCG through the RACH procedure is carried in the SCG activation command; in a case that the network side indicates not to activate the SCG through an RACH procedure, no indication information is carried in the SCG activation command.

In a possible embodiment of this application, S102 may specifically include: activating the SCG according to the SCG activation command; and if the SCG is activated successfully, recording information related to the SCG activation success procedure in a Random Access (RA) report.

To be specific, in the embodiments of this application, the information related to the SCG activation success procedure includes at least one of:
  information indicating that an access purpose of a current random access procedure is to activate an SCG;
  information about a RACH resource used in a current random access procedure, i.e., information about a dedicated and/or a common RACH resource used by the UE;
  information indicating whether RACH-less SCG activation is performed in a current procedure for activating the SCG, e.g., indicating that RACH-less SCG activation is performed once in the current procedure for activating the SCG, or indicating that RACH-less SCG activation is not performed in the current procedure for activating the SCG;
  a cause why RACH-less SCG activation is not performed, e.g., UL out-of-synchronization, occurrence of BF, or occurrence of RLF;
  information indicating a result of RACH-less SCG activation, e.g., indicating that the RACH-less SCG activation is performed successfully, or indicating that the RACH-less SCG activation is performed unsuccessfully;
  Timing Advance (TA) related information; for example, the following information may be recorded: a value of a TAT configured by the network side for the UE, a runtime value of the TAT at the time when the SCG activation command is received, or indication information indicating whether the TAT is running when the SCG activation command is received;
  Radio Resource Management (RRM) measurement related information, i.e., information about a latest RRM measurement result at a time when the SCG activation command is received by the UE;
  beam related information, which may, for example, include related information such as a beam index, a beam measurement result;
  Transmission Configuration Indicator (TCI) state information configured by the network side in the SCG activation command; in a case that BF occurs during the SCG activation, the network side may transmit the configured TCI state information to the UE, and the UE may record the TCI state information configured by the network side;
  information indicating whether the network side indicates to activate the SCG through an RACH procedure in the SCG activation command, i.e., recording first indication information which is used to indicate "whether the network side indicates to activate the SCG through an RACH procedure in the SCG activation command";
  information indicating whether a dedicated RACH resource configured by the network side for activating the SCG is carried in the SCG activation command, i.e., recording second indication information which is used to indicate "whether a dedicated RACH resource configured by the network side for activating the SCG is carried in the SCG activation command";
  information about a position and information about a mobility speed of the UE at a time when the SCG activation command is received;
  a time interval between a time point when the SCG activation command is received and a time point when the SCG is activated successfully;
  a time interval between a time point when it is detected that a Timing Advance Timer (TAT) has expired or stopped and a time point when the SCG activation command is received by the UE; i.e., when the SCG activation command is received and it is detected that the TAT has expired or stopped (that is, the TAT has expired or stopped in an SCG deactivated state), the time interval between the time point when it is detected by the UE that the TAT has expired or stopped and the time point when the SCG activation command is received by the UE needs to be recorded; or
  a time interval between a time point when Beam Failure (BF) or Radio Link Failure (RLF) is detected and a time point when the SCG activation command is received by the UE; i.e., when the SCG activation command is received and it is detected that the BF has occurred or the RLF has occurred (that is, the BF or RLF has occurred in the SCG deactivated state), the time interval between the time point when the BF or RLF is detected by the UE and the time point when the SCG activation command is received by the UE needs to be recorded.

In a possible embodiment of this application, the information processing method may further include:

S103: reporting the RA report to the network side in response to a request from the network side, where the RA report is used by the network side to perform SCG activation configuration optimization and/or Random Access Channel (RACH) resource optimization.

For example, in the SCG activation procedure, RACH-less SCG activation performed by the UE is failed and the SCG is successfully activated through an RACH procedure, then the network side determines, through analysis based on the RA report, that a purpose of the current RA procedure is to activate the SCG, and that there is a failure procedure of RACH-less SCG activation before performing the RACH procedure as the SCG activation command does not indicate the UE to activate the SCG through an RACH procedure, and the network side also knows a cause for the failure of the RACH-less SCG activation and some other conditions (e.g., an RRM measurement result and a beam measurement result). Hence, it is determined through analysis that in this case the SCG activation command needs to be directly used to indicate the UE to perform the SCG activation through an RACH procedure, so as to reduce SCG activation latency.

It should be noted that, the UE may report the RA report to the MN of the network side, so that the MN side performs the optimization, or the MN transmits all of, or a part of, information in the received RA report to the SN through an X2/Xn interface, so that the SN side performs the optimization, or the MN and the SN together perform the optimization; or the UE may directly transmit the RA report to the SN of the network side, so that the SN side performs the optimization.

In a possible embodiment of this application, S102 may specifically include: activating the SCG according to the SCG activation command; and if the SCG fails to be activated, recording information related to the SCG activation failure procedure in a Radio Link Failure (RLF) report or an SCG failure message.

To be specific, in the embodiments of this application, the information related to the SCG activation failure procedure includes at least one of:

information indicating that a failure type is SCG activation failure;

information about a RACH resource used in a current random access procedure, i.e., information about a dedicated and/or a common RACH resource used by the UE;

information indicating whether RACH-less SCG activation is performed in a current procedure for activating the SCG, e.g., indicating that RACH-less SCG activation is performed once in the current procedure for activating the SCG, or indicating that RACH-less SCG activation is not performed in the current procedure for activating the SCG;

a cause why RACH-less SCG activation is not performed, e.g., UL out-of-synchronization, occurrence of BF, or occurrence of RLF;

information indicating a result of RACH-less SCG activation, e.g., indicating that the RACH-less SCG activation is performed successfully, or indicating that the RACH-less SCG activation is performed unsuccessfully;

Timing Advance (TA) related information; for example, the following information may be recorded: a value of a TAT configured by the network side for the UE, a runtime value of the TAT at the time when the SCG activation command is received, or indication information indicating whether the TAT is running when the SCG activation command is received;

Radio Resource Management (RRM) measurement related information, i.e., information about a latest RRM measurement result at a time when the SCG activation command is received by the UE;

beam related information, which may, for example, include related information such as a beam index, a beam measurement result;

Transmission Configuration Indicator (TCI) state information configured by the network side in the SCG activation command; in a case that BF occurs during the SCG activation, the network side may transmit the configured TCI state information to the UE, and the UE may record the TCI state information configured by the network side;

information indicating whether the network side indicates to activate the SCG through an RACH procedure in the SCG activation command, i.e., recording first indication information which is used to indicate "whether the network side indicates to activate the SCG through an RACH procedure in the SCG activation command";

information indicating whether a dedicated RACH resource configured by the network side for activating the SCG is carried in the SCG activation command, i.e., recording second indication information which is used to indicate "whether a dedicated RACH resource configured by the network side for activating the SCG is carried in the SCG activation command";

information about a position and information about a mobility speed of the UE at a time when the SCG activation command is received;

a time interval between a time point when the SCG activation command is received and a time point when the SCG is activated successfully;

a time interval between a time point when repeated herein for brevity a Timing Advance Timer (TAT) has expired or stopped and a time point when the SCG activation command is received by the UE; i.e., when the SCG activation command is received and it is detected that the TAT has expired or stopped (that is, the TAT has expired or stopped in an SCG deactivated state), the time interval between the time point when it is detected by the UE that the TAT has expired or stopped and the time point when the SCG activation command is received by the UE needs to be recorded; or a time interval between a time point when Beam Failure (BF) or Radio Link Failure (RLF) is detected and a time point when the SCG activation command is received by the UE; i.e., when the SCG activation command is received and it is detected that the BF has occurred or the RLF has occurred (that is, the BF or RLF has occurred in the SCG deactivated state), the time interval between the time point when the BF or RLF is detected and the time point when the SCG activation command is received by the UE needs to be recorded for the UE.

In a possible embodiment of this application, the information processing method may further include following step.

S104 includes: transmitting the SCG failure message to the network side; or

S105 includes: reporting the RLF report to the network side in response to a request from the network side;

the RLF report or the SCG failure message is used by the network side to analyze a cause for a current SCG activation failure and perform SCG activation configuration optimization and/or RACH resource optimization.

It should be noted that, the UE may transmit the RLF report or the SCG failure message to the MN, and the MN may transmit all of, or a part of, information in the received RLF report or SCG failure message to the SN through the X2/Xn interface, so that the MN and/or the SN determines, through analysis, that the current failure is caused due to SCG activation failure and analyzes the specific cause for the failure; or, the UE may directly transmit the RLF report to the SN, and the SN determines, through analysis, that the current failure is caused due to SCG activation failure and analyzes the specific cause for the failure. For example, in the case of inappropriate RACH resource configuration, corresponding RACH resource optimization is performed, so as to reduce probability of SCG activation failure.

Figure 2:
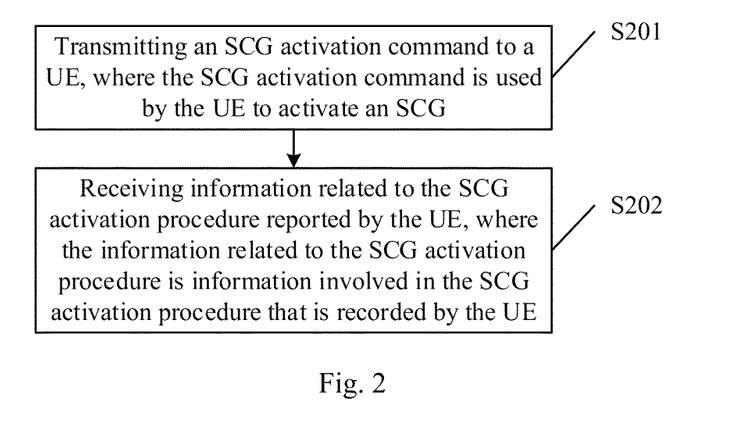
FIG. 2 is a flow chart of an information processing method according to embodiments of this application.

As shown in FIG. 2, this application further provides in some embodiments an information processing method applied to a network side, which includes following steps.

S201 includes: transmitting a Secondary Cell Group (SCG) activation command to a User Equipment (UE), where the SCG activation command is used by the UE to activate an SCG.

S202 includes: receiving information related to the SCG activation procedure reported by the UE, where the information related to the SCG activation procedure is information involved in the SCG activation procedure that is recorded by the UE.

In a possible embodiment of this application, the network side includes a Master Node (MN) side and a Secondary Node (SN) side, where in a case that the information related to the SCG activation procedure is received by the MN side from the UE, the information processing method further includes:

performing, by the MN, optimization processing according to the information related to the SCG activation procedure; and transmitting, by the MN, all of or a part of information in the information related to the SCG activation procedure to the SN, in order for the SN to perform optimization processing or the SN and the MN together to perform optimization processing;

in a case that the information related to the SCG activation procedure is received by the SN side from the UE, the information processing method further includes: performing, by the SN, optimization processing according to the information related to the SCG activation procedure.

In other words, after receiving the information related to the SCG activation procedure from the UE, the MN of the network side may perform the optimization according to the information, or transmit all of, or a part of, the received information to the SN through an X2/Xn interface, so that the SN side performs the optimization or the MN and the SN together perform the optimization; or, after receiving the information related to the SCG activation procedure from the UE, the SN of the network side may perform the optimization according to the information.

In a possible embodiment of this application, the performing the optimization processing includes:

performing SCG activation configuration optimization and/or Random Access Channel (RACH) resource optimization according to information related to an SCG activation success procedure recorded in a Random Access (RA) report;

analyzing a cause for a current SCG activation failure according to information related to an SCG activation failure procedure recorded in a Radio Link Failure (RLF) report or an SCG failure message, and performing SCG activation configuration optimization and/or RACH resource optimization.

To be specific, in the embodiments of this application, in the SCG activation procedure, RACH-less SCG activation performed by the UE is failed and the SCG is successfully activated through an RACH procedure, then the network side determines, through analysis based on the RA report which is reported by the UE, that a purpose of the current RA procedure is to activate the SCG, and that there is a failure procedure of RACH-less SCG activation before performing the RACH procedure as the SCG activation command does not indicate the UE to activate the SCG through an RACH procedure, and the network side also knows a cause for the failure of the RACH-less SCG activation and some other conditions (e.g., an RRM measurement result and a beam measurement result). Hence, it is determined through analysis that in this case the SCG activation command needs to be directly used to indicate the UE to perform the SCG activation through an RACH procedure, so as to reduce SCG activation latency.

In a case that the RLF report or the SCG failure message is received by the MN from the UE, it may transmit all of, or a part of, information in the received RLF report or SCG failure message to the SN, and the MN and/or the SN determines, through analysis, that the current failure is caused due to SCG activation failure and analyzes the specific cause for the failure; or, in a case that the RLF report is received by the SN from the UE, it may determines, through analysis, that the current failure is caused due to SCG activation failure and analyzes the specific cause for the failure. For example, in the case of inappropriate RACH resource configuration, corresponding RACH resource optimization is performed, so as to reduce probability of SCG activation failure.

In other words, according to the information processing method in the embodiments of this application, the SCG activation command for activating the SCG by the UE is transmitted to the UE, and the related information recorded by the UE in the SCG activation procedure is received from the UE, so that optimization of SCG activation procedure is performed according to the information related to the SCG activation procedure, which reduces SCG activation latency, and reduces probability of SCG activation failure.

The applications of the information processing method in different SCG activation scenarios will be described hereinafter in conjunction with first to third embodiments.

Figure 3:
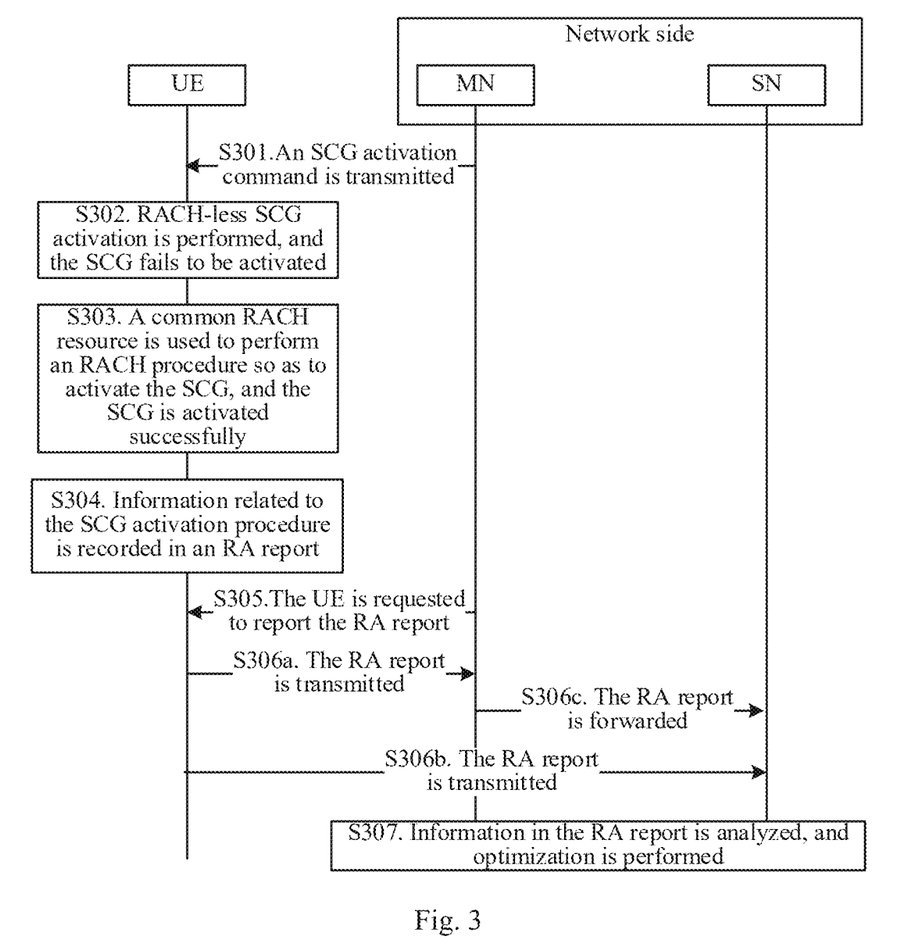
FIG. 3 is a schematic diagram of interaction in an information processing method according to embodiments of this application.

First Embodiment: an SCG activation scenario where RACH-less SCG activation performed by the UE is failed and the SCG is successfully activated through an RACH procedure.

As shown in FIG. 3, the information processing method includes the following steps.

S301: the network side transmits the SCG activation command to the UE, and the SCG activation command does not indicate the UE to activate the SCG through an RACH procedure.

S302: after the SCG activation command is received by the UE, in a case that it is detected that the TAT is still running and BF and RLF are not detected, the UE performs RACH-less SCG activation, and activation of the SCG is failed.

S303: the UE uses a common RACH resource to perform an RACH procedure to activate the SCG, and activation of the SCG is successful.

S304: the UE records the information related to the SCG activation procedure in the RA report. The related information includes one or more of:
(1) an access purpose of the current RA procedure, i.e., the RA purpose is to activate the SCG;
(2) information about the RACH resource used in the current RA procedure, i.e., information about the common RACH resource used by the UE;
(3) indication information 1, for indicating that the RACH-less SCG activation is performed once in the current procedure for activating the SCG;
(4) indication information 2, for indicating that the RACH-less SCG activation is failed;
(5) TA related information; the following may be recorded: a value of the TAT configured by the network side for the UE, a runtime value of the TAT at the time when the SCG activation command is received, or indication information indicating that the TAT is running when the SCG activation command is received;
(6) RRM measurement related information, i.e., information about a latest RRM measurement result at the time when the SCG activation command is received by the UE;
(7) beam related information, which may include related information such as a beam index and a beam measurement result;
(8) TCI state information configured by the network side in the SCG activation command; in a case that BF occurs during the SCG activation, the network side may transmit the configured TCI state information to the UE, and the UE may record the TCI state information configured by the network side;
(9) indication information 3, for indicating that the network side indicates the UE not to activate the SCG through an RACH procedure in the SCG activation command;
(10) indication information 4, for indicating that the network side does not configure a dedicated RACH resource to activate the SCG in the SCG activation command;
(11) information about a position and information about a mobility speed of the UE at the time when the SCG activation command is received; or
(12) a time interval between a time point when the SCG activation command is received and a time point when the SCG is activated successfully.

S305: the network side requests the UE to report the RA report.

S306a: the UE reports the RA report to the MN.

S306c: the MN transmits the received RA report to the SN.

It should be noted that, the UE reports the RA report to the MN, and the MN may perform analysis according to the RA report, or the MN transmits all of, or a part of, the information in the received RA report to the SN.

S306b: the UE reports the RA report to the SN.

S307: after the SN receives the RA report from the MN, the SN performs analysis, or the MN and the SN together perform analysis; or, after the SN receives the RA report from the UE, the SN performs analysis; or, after the MN receives the RA report from the UE, the MN performs analysis, and then it is determined that the purpose of the current RA procedure is to activate the SCG, and that there is a failure procedure of RACH-less SCG activation before performing the RACH procedure as the SCG activation command does not indicate the UE to activate the SCG through an RACH procedure, and a cause for the failure of the RACH-less SCG activation and some other conditions (e.g., an RRM measurement result and a beam measurement result) are also determined. Hence, it is determined through analysis that in this case the SCG activation command needs be directly used to indicate the UE to perform the SCG activation through an RACH procedure, so as to reduce SCG activation latency.

Second Embodiment: a scenario where the UE activates the SCG successfully directly through an RACH procedure. The following examples may be included.

First Example

Step 1-a: the SCG activation command transmitted by the network side indicates the UE to activate the SCG through an RACH procedure, and the SCG activation command carries a dedicated RACH resource.

Step 2: after receiving the SCG activation command, the UE successfully activates the SCG through an RACH procedure using the dedicated RACH resource.

Step 2-a: after receiving the SCG activation command, the UE performs an RACH procedure using the dedicated RACH resource but activation of the SCG is failed, then the UE performs an RACH procedure using the common RACH resource and activation of the SCG is successful.

Step 3-a: the UE records one or more of the following information in the RA report:
(1) an access purpose of the current RA procedure, i.e., the RA purpose is to activate the SCG;
(2) information about the RACH resource used in the current RA procedure, i.e., information about the dedicated and/or common RACH resource used by the UE;
(3) indication information 5, for indicating that RACH-less SCG activation is not performed in the current procedure for activating the SCG;
(4) a cause why RACH-less SCG activation is not performed, e.g., the TAT has expired or stopped, BF is detected or RLF is detected;
(5) TA related information; the following may be recorded: a value of the TAT configured by the network side for the UE, a runtime value of the TAT at the time when the SCG activation command is received, or indication information indicating that the TAT is running when the SCG activation command is received;
(6) RRM measurement related information, i.e., information about a latest RRM measurement result at the time when the SCG activation command is received by the UE;
(7) beam related information, which may include related information such as a beam index and a beam measurement result;
(8) TCI state information configured by the network side in the SCG activation command; in a case that BF occurs during the SCG activation, the network side may transmit the configured TCI state information to the UE, and the UE may record the TCI state information configured by the network side;

(9) indication information 6, for indicating whether the network side indicates to activate the SCG through an RACH procedure in the SCG activation command;
(10) indication information 7, for indicating whether the network side configures a dedicated RACH resource to activate the SCG in the SCG activation command;
(11) information about a position and information about a mobility speed of the UE at the time when the SCG activation command is received;
(12) a time interval between a time point when the SCG activation command is received and a time point when the SCG is activated successfully;
(13) a time interval between a time point when it is detected that the TAT has expired or stopped and a time point when the SCG activation command is received by the UE; or
(14) a time interval between a time point when the BF or RLF is detected and a time point when the SCG activation command is received by the UE.

Step 4-a: the network side requests the UE to report the RA report.

Step 5-a1: the UE reports the RA report to the MN, and the MN transmits the received RA report to the SN.

It should be noted that, the UE reports the RA report to the MN, the MN may perform analysis according to the RA report, or the MN transmits all of, or a part of, the information in the received RA report to the SN.

Step 5-a2: the UE reports the RA report to the SN.

Step 6-a1: after the RA report is received by the SN from the MN, the SN performs analysis, or the MN and the SN together perform analysis, it is determined that a purpose of the current RA procedure is to activate the SCG, and the SCG activation procedure is analyzed.

Step 6-a2: after the RA report is received by the SN from the UE, the SN performs analysis, it is determined that a purpose of the current RA procedure is to activate the SCG, and the SCG activation procedure is analyzed.

Through the analysis in Step 6-a1 or 6-a2, it is determined that the random access performed by the UE using the dedicated RACH resource configured in the SCG activation command is failed, and that activation of the SCG performed by using the common RACH resource is successful. The network side device determines that the failure is caused due to the fact that the configured dedicated RACH resource is inappropriate, so it optimizes configured dedicated RACH resource, so as to reduce SCG activation latency.

Second Example

Step 1-b: the SCG activation command transmitted by the network side indicates the UE to activate the SCG through an RACH procedure, and the SCG activation command does not carry a dedicated RACH resource.

Step 2-b: after receiving the SCG activation command, the UE performs an RACH procedure using the common RACH resource and activates the SCG successfully.

For other steps of this solution, reference may be made to Step 3-a to Step 5-a2 in the First Example, which will not be repeated herein for brevity.

Third Example

Step 1-c: the SCG activation command transmitted by the network side does not indicate the UE to activate the SCG through an RACH procedure.

Step 2-c: after receiving the SCG activation command, the UE determines that the TAT has expired or stopped, or BF is detected or RLF is detected; in this case, the UE performs an RACH procedure using the common RACH resource and activates the SCG successfully.

For Steps 3-c to 6-c2, reference may be made to Step 3-a to Step 6-a2 in the First Example, which will not be repeated herein for brevity.

Through the analysis in Step 6-c1 or Step 6-c2, it is determined that the purpose of the current RA procedure is to activate the SCG, the SCG activation command indicates the UE not to activate the SCG through an RACH procedure, and the UE activates the SCG successfully through an RACH procedure using the common RACH resource; and a cause why the SCG is activated by the UE through the RACH procedure is determined (e.g., the TAT has expired, or BF is detected or RLF is detected). Hence, it is determined through analysis that in this case the SCG activation command needs be directly used to indicate the UE to perform the SCG activation through an RACH procedure, so as to reduce SCG activation latency.

Third Embodiment: a scenario where activation of the SCG performed by the UE is failed.

After receiving the SCG activation command, the UE activates the SCG through an RACH-less procedure or an RACH procedure, according to whether the received SCG activation command indicates to perform an RACH procedure, and detection results of the TAT, RLM and BFD of the UE itself, but finally activation of the SCG is failed. The UE may record one or more of the following information in the RLF report or the SCG failure message:
(1) a failure type, i.e., SCG activation failure;
(2) information about the RACH resource used in the current RA procedure, i.e., information about the dedicated and/or common RACH resource used by the UE;
(3) indication information 8, for indicating whether RACH-less SCG activation is performed once in the current procedure for activating the SCG;
(4) indication information 2, for indicating that RACH-less SCG activation is failed;
(5) a cause why RACH-less SCG activation is not performed, e.g., the TAT has expired or stopped, BF is detected or RLF is detected;
(6) TA related information; the following may be recorded: a value of the TAT configured by the network side for the UE, a runtime value of the TAT at the time when the SCG activation command is received, or indication information indicating that the TAT is running when the SCG activation command is received;
(7) beam related information; for example, information related to a beam where the failure occurs in a case that BF is detected during SCG activation, e.g., an index of the beam where the failure occurs, and a beam measurement result;
(8) RRM measurement related information, i.e., information about a latest RRM measurement result at the time when the SCG activation command is received by the UE;
(9) TCI state information configured by the network side in the SCG activation command; in a case that BF occurs during the SCG activation, the network side may transmit the configured TCI state information to the UE, and the UE may record the TCI state information configured by the network side;
(10) indication information 6, for indicating whether the network side indicates to activate the SCG through an RACH procedure in the SCG activation command;

(11) indication information 7, for indicating whether the network side configures a dedicated RACH resource to activate the SCG in the SCG activation command;

(12) information about a position and information about a mobility speed of the UE at the time when the SCG activation command is received;

(13) a time interval between a time point when the SCG activation command is received and a time point when activation of the SCG is failed;

(14) a time interval between a time point when it is detected that the TAT has expired or stopped and a time point when the SCG activation command is received by the UE; or (15) a time interval between a time point when the BF or RLF is detected and a time point when the SCG activation command is received by the UE.

The UE transmits the RLF report or the SCG failure message to the MN, and the MN may transmit all of, or a part of, information in the received RLF report or SCG failure message to the SN, so that the MN and/or the SN determines, through analysis, that the current failure is caused due to SCG activation failure and analyzes the specific cause for the failure; or, the UE may directly transmit the RLF report to the SN, and the SN determines, through analysis, that the current failure is caused due to SCG activation failure and analyzes the specific cause for the failure. For example, in the case of inappropriate RACH resource configuration, corresponding RACH resource optimization is performed, so as to reduce probability of SCG activation failure.

Figure 4:
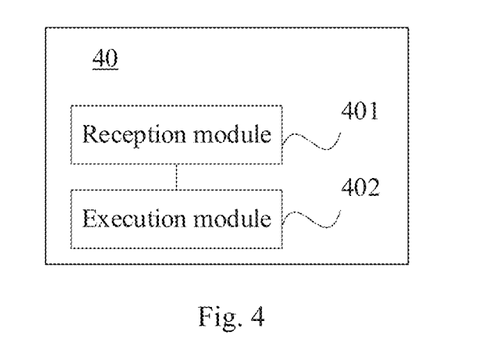
FIG. 4 is a block diagram of a UE according to embodiments of this application.

Based on a same inventive concept, this application further provides in some embodiments an information processing apparatus applied to a UE. As shown in FIG. 4, the information processing apparatus includes:

a reception module 401, configured to receive a Secondary Cell Group (SCG) activation command from a network side; and an execution module 402, configured to activate an SCG according to the SCG activation command, and record information related to the SCG activation procedure, to report it to the network side.

In a possible embodiment of this application, the execution module is specifically configured to: activate the SCG according to the SCG activation command; and if the SCG is activated successfully, record information related to the SCG activation success procedure in a Random Access (RA) report.

In a possible embodiment of this application, the information related to the SCG activation success procedure includes: information indicating that an access purpose of a current random access procedure is to activate an SCG.

In a possible embodiment of this application, the execution module is further configured to: report the RA report to the network side in response to a request from the network side, where the RA report is used by the network side to perform SCG activation configuration optimization and/or Random Access Channel (RACH) resource optimization.

In a possible embodiment of this application, the execution module is specifically configured to: activate the SCG according to the SCG activation command; and if the SCG fails to be activated, record information related to the SCG activation failure procedure in a Radio Link Failure (RLF) report or an SCG failure message.

In a possible embodiment of this application, the information related to the SCG activation failure procedure includes: information indicating that a failure type is SCG activation failure.

In a possible embodiment of this application, the execution module is further configured to: send the SCG failure message to the network side; or report the RLF report to the network side in response to a request from the network side; where the RLF report or the SCG failure message is used by the network side to analyze a cause for a current SCG activation failure and perform SCG activation configuration optimization and/or RACH resource optimization.

In the embodiments of this application, the information related to the SCG activation success/failure procedure further includes at least one of: information about a RACH resource used in a current random access procedure; information indicating whether RACH-less SCG activation is performed in a current procedure for activating the SCG; a cause why RACH-less SCG activation is not performed; information indicating a result of RACH-less SCG activation; Timing Advance (TA) related information; Radio Resource Management (RRM) measurement related information; beam related information; Transmission Configuration Indicator (TCI) state information configured by the network side in the SCG activation command; information indicating whether the network side indicates to activate the SCG through an RACH procedure in the SCG activation command; information indicating whether a dedicated RACH resource configured by the network side for activating the SCG is carried in the SCG activation command; information about a position and information about a mobility speed of the UE at a time when the SCG activation command is received; a time interval between a time point when the SCG activation command is received and a time point when the SCG is activated successfully; a time interval between a time point when it is detected that a Timing Advance Timer (TAT) has expired or stopped and a time point when the SCG activation command is received by the UE; or a time interval between a time point when Beam Failure (BF) or Radio Link Failure (RLF) is detected and a time point when the SCG activation command is received by the UE.

In a possible embodiment of this application, the TA related information includes at least one of: a configured value of the TAT; a runtime value of the TAT at the time when the SCG activation command is received; or indication information indicating whether the TAT is running when the SCG activation command is received.

For details which are not provided for the information processing apparatus in the embodiments of this application, reference may be made to implementation of the information processing method in FIGS. 1 and 3, and beneficial effects of the apparatus in the embodiments of this application are the same as those of the method in the embodiments of FIGS. 1 and 3, which will not be particularly defined herein.

Figure 5:
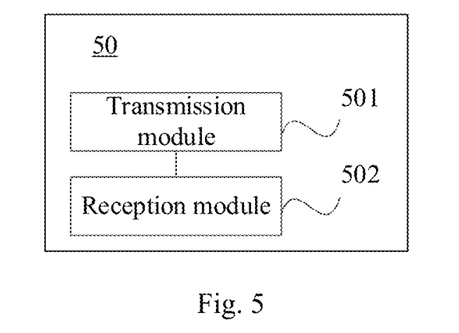
FIG. 5 is a block diagram of a network side device according to embodiments of this application.

Based on a same inventive concept, this application further provides in some embodiments an information processing apparatus applied to a network side. As shown in FIG. 5, the information processing apparatus 50 includes:

a transmission module 501, configured to transmit a Secondary Cell Group (SCG) activation command to a User Equipment (UE), where the SCG activation command is used by the UE to activate an SCG; and a reception module 502, configured to receive information related to the SCG activation procedure reported by the UE, where the information related to the SCG activation procedure is information involved in the SCG activation procedure that is recorded by the UE.

In a possible embodiment of this application, the network side device includes a Master Node (MN) and a Secondary Node (SN), and the information processing apparatus 50 further includes: a processing module;

in a case that the information related to the SCG activation procedure is received by the MN from the UE, the processing module is configured to: perform, via the MN, optimization processing according to the information related to the SCG activation procedure; and the transmission module is further configured to: transmit, via the MN, all of or a part of information in the information related to the SCG activation procedure to the SN, in order for the SN to perform optimization processing or the SN and the MN together to perform optimization processing;

in a case that the information related to the SCG activation procedure is received by the SN side from the UE, the processing module is further configured to: perform, via the SN, optimization processing according to the information related to the SCG activation procedure.

In a possible embodiment of this application, when performing the optimization processing, the processing module is specifically configured to:

perform SCG activation configuration optimization and/or Random Access Channel (RACH) resource optimization according to information related to an SCG activation success procedure recorded in a Random Access (RA) report;

analyze a cause for a current SCG activation failure according to information related to an SCG activation failure procedure recorded in a Radio Link Failure (RLF) report or an SCG failure message, and perform SCG activation configuration optimization and/or RACH resource optimization.

For details which are not provided for the information processing apparatus in the embodiments of this application, reference may be made to implementation of the information processing method in FIGS. 2 and 3, and beneficial effects of the apparatus in the embodiments of this application are the same as those of the method in the embodiments of FIGS. 2 and 3, which will not be particularly defined herein.

Based on a same principle as the above-mentioned information processing method, this application further provides in some embodiments an electronic device, including a memory, a processor, and at least one program stored in the memory and executable by the processor. As compared with the related technologies: when the UE activates the SCG according to the SCG activation command from the network side, the UE records the information related to the SCG activation procedure, and reports it to the network side, which assists the network side in optimizing the SCG activation procedure, reduces SCG activation latency, and reduces probability of SCG activation failure.

The electronic device in the embodiments of this application may be the UE or the network side device according the above embodiments.

Figure 6:
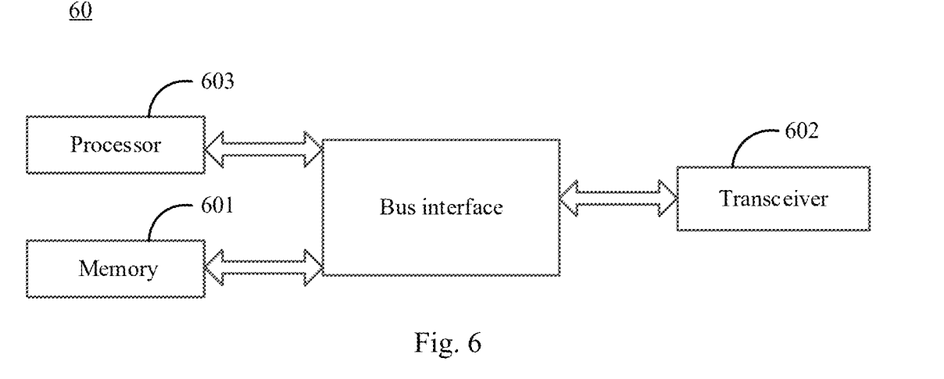
FIG. 6 is a schematic diagram of a UE according to embodiments of this application.

This application provides in some embodiments a UE 60 which, as shown in FIG. 6, includes a processor 603 and a memory 601. The processor 603 is coupled to the memory 601, for example, coupled through a bus interface. In a possible embodiment of this application, the UE 60 further includes a transceiver 602 configured to perform data interaction between the UE and the other UE, e.g., transmit and/or receive data. It should be appreciated that, in actual use, the quantity of transceiver 602 is not limited to one, and the structure of the UE 60 shall not be construed as limiting the scope of this application.

It should be appreciated that in the embodiments of this application, in FIG. 6, a bus architecture may include any quantity of interconnected buses and bridges. Various circuits including one or more processors represented by the processor 603 and a memory represented by the memory 601 are linked. The bus architecture may further link various other circuits together, such as a periphery component, a voltage stabilizer and a power management circuit, which are known in the art and are not further described herein. A bus interface provides an interface. The transceiver 602 may be multiple elements, i.e., including a transmitter and a receiver, providing a unit for communicating with various other devices on transmission media. The transmission media include a wireless channel, a wired channel, an optical cable, or other transmission media.

The processor 603 is in charge of managing the bus architecture and common processes. The memory 602 may store data used by the processor 603 in performing operations.

Figure 7:
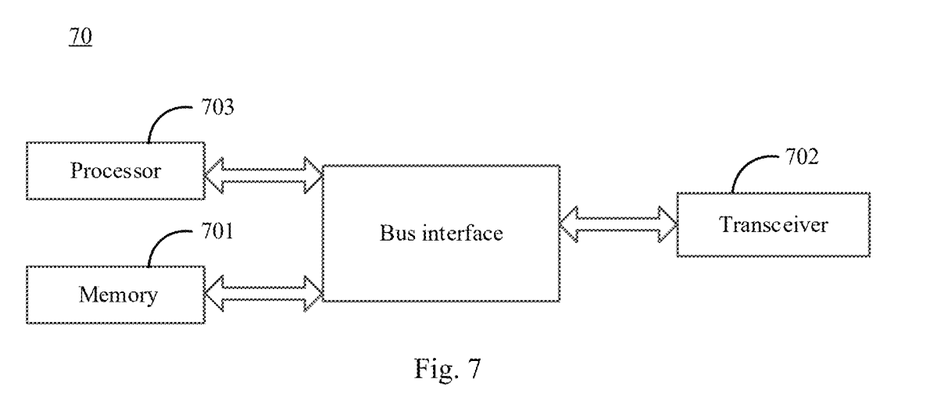
FIG. 7 is a schematic diagram of a network side device according to embodiments of this application.

This application further provides in some embodiments a network side device 70 which, as shown in FIG. 7, includes a processor 703 and a memory 701. The processor 703 is coupled to the memory 701, for example, coupled through a bus interface. In a possible embodiment of this application, the network side device 70 further includes a transceiver 702 configured to perform data interaction between the network side device and the other network side device, e.g., transmit and/or receive data. It should be appreciated that, in actual use, the quantity of transceiver 702 is not limited to one, and the structure of the network side device 70 shall not be construed as limiting the scope of this application.

It should be appreciated that, in the embodiments of this application, in FIG. 7, a bus architecture may include any quantity of interconnected buses and bridges. Various circuits including one or more processors represented by the processor 703 and a memory represented by the memory 701 are linked. The bus architecture may further link various other circuits together, such as a periphery component, a voltage stabilizer and a power management circuit, which are known in the art and are not further described herein. A bus interface provides an interface. The transceiver 702 may be multiple elements, i.e., including a transmitter and a receiver, providing a unit for communicating with various other devices on transmission media. The transmission media include a wireless channel, a wired channel, an optical cable, or other transmission media.

The processor 703 is in charge of managing the bus architecture and common processes. The memory 701 may store data used by the processor 703 in performing operations.

In a possible embodiment of this application, the processor 603 and/or the processor 703 may be a central processing unit (CPU), a specific integrated circuit (Application Specific Integrated Circuit, ASIC), a field-programmable gate array (Field-Programmable Gate Array, FPGA), or a complex programmable logic device (Complex Programmable Logic Device, CPLD), or the processor may use a multi-core architecture.

The processor is configured to call a computer program in the memory, so as to implement the above-mentioned method according to obtained executable instructions. The processor may also be physically separated from the memory.

This application further provides in some embodiments a computer readable storage medium storing therein a computer program. The computer program is executed by a computer so as to implement the above-mentioned method. As compared with the related art, when the SCG is activated according to the SCG activation command from the network side, the UE records the information related to the SCG activation procedure, and reports it to the network side. As a result, it is able to help the network side to optimize the SCG activation procedure, reduce an SCG activation latency, and reduce a probability of an SCG activation failure.

It should be noted that the division of units in the embodiments of this application is schematic and only serves as a division of logical functions, and there may be other division methods in actual implementations. In addition, in the embodiments of this application, various functional units may be integrated into a single processing unit, or the various units may be physically separated, or two or more units may be integrated into one unit. The integrated unit in the above may be implemented in the form of hardware or may be implemented in the form of software functional units.

If the integrated unit is implemented in the form of software functional units and sold or used as an independent product, it may be stored in a processor readable storage medium. Based on this understanding, essence of the technical solutions of this application, or the part contributing to the related technologies, or part or all of the technical solutions, may be embodied in the form of a software product. The computer software product is stored in a storage medium, and includes a number of instructions to enable a computer device (which may be a personal computer, a server, or a network device, etc.) or a processor (processor) to perform all or part of the steps of method described in the various embodiments of this application. The storage medium includes a USB flash disk, a mobile hard disk, a read-only memory (Read-Only Memory, ROM), a random access memory (Random Access Memory, RAM), a magnetic disk, an optical disk, or other medium which can store program code.

It should be noted that, although with arrows, the steps in the flow charts may not be necessarily performed in an order indicated by the arrows. Unless otherwise defined, the order of the steps may not be strictly defined, i.e., the steps may also be performed in another order. In addition, each of at least parts of the steps in the flow charts may include multiple sub-steps or stages, and these sub-steps or stages may not be necessarily performed at the same time, i.e., they may also be performed at different times. Furthermore, these sub-steps or stages may not be necessarily performed sequentially, and instead, they may be performed in turn or alternately with the other steps or at least parts of sub-steps or stages of the other steps.

Some embodiments of this application are described in the above. It should be noted that those skilled in the art may make various improvements and modifications without departing from the principles described in this application, and the various improvements and modifications fall within the protection scope of this application.

What is claimed is:

1. An information processing method, applied to a User Equipment (UE), comprising:
receiving a Secondary Cell Group (SCG) activation command from a network side; and
activating an SCG according to the SCG activation command, and recording information related to the SCG activation procedure;
wherein the activating the SCG according to the SCG activation command and recording the information related to the SCG activation procedure comprises:
activating the SCG according to the SCG activation command; and if the SCG is activated successfully, recording information related to the SCG activation success procedure in a Random Access (RA) report, wherein the information related to the SCG activation success procedure comprises: information indicating that an access purpose of a current random access procedure is to activate an SCG; or,
activating the SCG according to the SCG activation command; and if the SCG fails to be activated, recording information related to the SCG activation failure procedure in a Radio Link Failure (RLF) report or an SCG failure message, wherein the information related to the SCG activation failure procedure comprises: information indicating that a failure type is SCG activation failure;
wherein the information related to the SCG activation success/failure procedure further comprises at least one of:
information about a RACH resource used in a current random access procedure;
information indicating whether RACH-less SCG activation is performed in a current procedure for activating the SCG;
a cause why RACH-less SCG activation is not performed;
information indicating a result of RACH-less SCG activation;
Timing Advance (TA) related information;
Radio Resource Management (RRM) measurement related information;
beam related information;
Transmission Configuration Indicator (TCI) state information configured by the network side in the SCG activation command;
information indicating whether the network side indicates to activate the SCG through an RACH procedure in the SCG activation command;
information indicating whether a dedicated RACH resource configured by the network side for activating the SCG is carried in the SCG activation command;
information about a position and information about a mobility speed of the UE at a time when the SCG activation command is received;
a time interval between a time point when the SCG activation command is received and a time point when the SCG is activated successfully;
a time interval between a time point when it is detected that a Timing Advance Timer (TAT) has expired or stopped and a time point when the SCG activation command is received by the UE; or
a time interval between a time point when Beam Failure (BF) or Radio Link Failure (RLF) is detected and a time point when the SCG activation command is received by the UE;
wherein the TA related information comprises at least one of:
a configured value of the TAT;
a runtime value of the TAT at a time when the SCG activation command is received; or
indication information indicating whether the TAT is running when the SCG activation command is received.

2. The information processing method according to claim 1, further comprising: reporting the RA report to the network side in response to a request from the network side, wherein the RA report is used by the network side to perform SCG activation configuration optimization and/or Random Access Channel (RACH) resource optimization.

3. The information processing method according to claim 1, further comprising:
sending the SCG failure message to the network side; or
reporting the RLF report to the network side in response to a request from the network side;
wherein the RLF report or the SCG failure message is used by the network side to analyze a cause for a current SCG activation failure and perform SCG activation configuration optimization and/or RACH resource optimization.

4. An information processing apparatus, applied to a User Equipment (UE), comprising:
a reception module, configured to receive a Secondary Cell Group (SCG) activation command from a network side; and
an execution module, configured to activate an SCG according to the SCG activation command, and record information related to the SCG activation procedure;
wherein activating the SCG according to the SCG activation command and recording the information related to the SCG activation procedure comprises:
activating the SCG according to the SCG activation command; and if the SCG is activated successfully, recording information related to the SCG activation success procedure in a Random Access (RA) report, wherein the information related to the SCG activation success procedure comprises: information indicating that an access purpose of a current random access procedure is to activate an SCG; or,
activating the SCG according to the SCG activation command; and if the SCG fails to be activated, recording information related to the SCG activation failure procedure in a Radio Link Failure (RLF) report or an SCG failure message, wherein the information related to the SCG activation failure procedure comprises: information indicating that a failure type is SCG activation failure;
wherein the information related to the SCG activation success/failure procedure further comprises at least one of:
information about a RACH resource used in a current random access procedure;
information indicating whether RACH-less SCG activation is performed in a current procedure for activating the SCG;
a cause why RACH-less SCG activation is not performed;
information indicating a result of RACH-less SCG activation;
Timing Advance (TA) related information;
Radio Resource Management (RRM) measurement related information;
beam related information;
Transmission Configuration Indicator (TCI) state information configured by the network side in the SCG activation command;
information indicating whether the network side indicates to activate the SCG through an RACH procedure in the SCG activation command;
information indicating whether a dedicated RACH resource configured by the network side for activating the SCG is carried in the SCG activation command;
information about a position and information about a mobility speed of the UE at a time when the SCG activation command is received;
a time interval between a time point when the SCG activation command is received and a time point when the SCG is activated successfully;
a time interval between a time point when it is detected that a Timing Advance Timer (TAT) has expired or stopped and a time point when the SCG activation command is received by the UE; or
a time interval between a time point when Beam Failure (BF) or Radio Link Failure (RLF) is detected and a time point when the SCG activation command is received by the UE;
wherein the TA related information comprises at least one of:
a configured value of the TAT;
a runtime value of the TAT at a time when the SCG activation command is received; or
indication information indicating whether the TAT is running when the SCG activation command is received.

5. The information processing apparatus according to claim 4, wherein the execution module is further configured to: report the RA report to the network side in response to a request from the network side, wherein the RA report is used by the network side to perform SCG activation configuration optimization and/or Random Access Channel (RACH) resource optimization.

6. The information processing apparatus according to claim 4, wherein the execution module is further configured to:
send the SCG failure message to the network side; or
report the RLF report to the network side in response to a request from the network side;
wherein the RLF report or the SCG failure message is used by the network side to analyze a cause for a current SCG activation failure and perform SCG activation configuration optimization and/or RACH resource optimization.

7. A non-transitory computer readable storage medium, having a computer program stored thereon, wherein the computer program is executed by a processor to implement the information processing method according to claim 1.

* * * * *